June 27, 1967 S. R. BARNETTE 3,328,500
METHOD OF MAKING SELF-REINFORCED PLASTIC ARTICLES
Filed Jan. 14, 1963 2 Sheets-Sheet 1
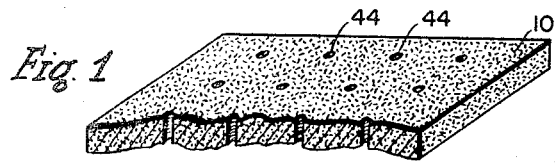
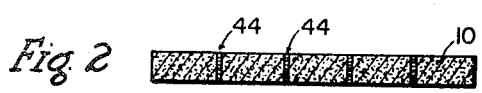
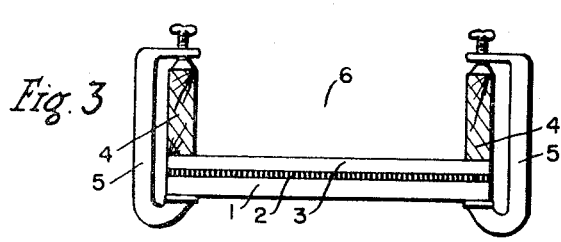
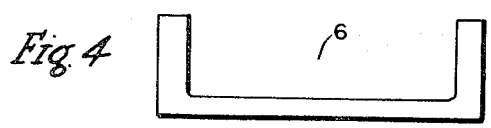
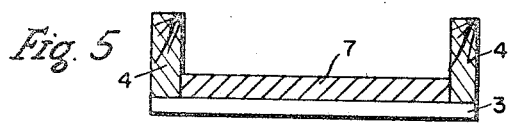
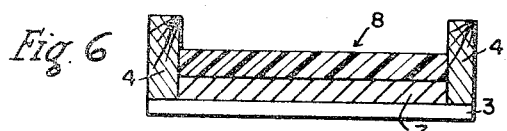
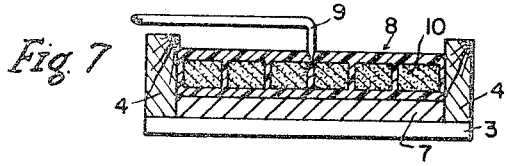
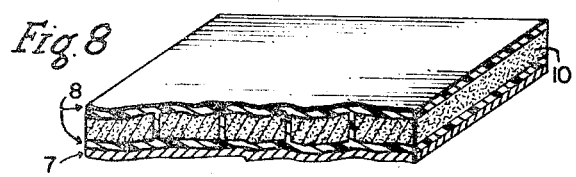
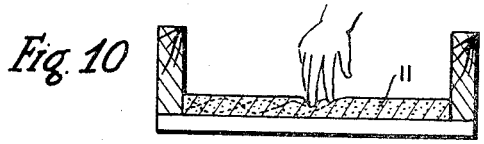
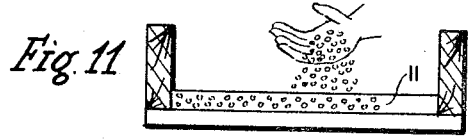
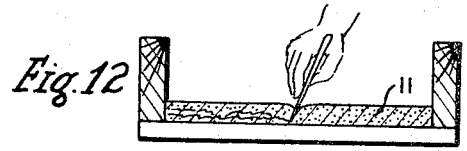
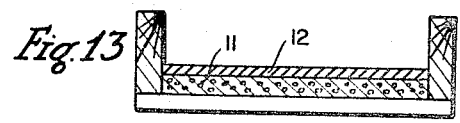
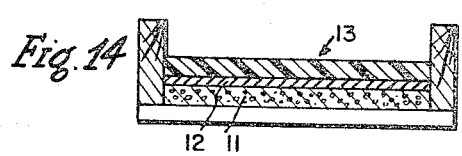
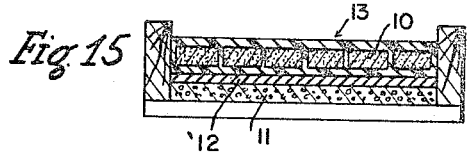
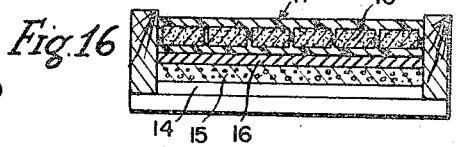
INVENTOR.
BY Stanley Ronald Barnette

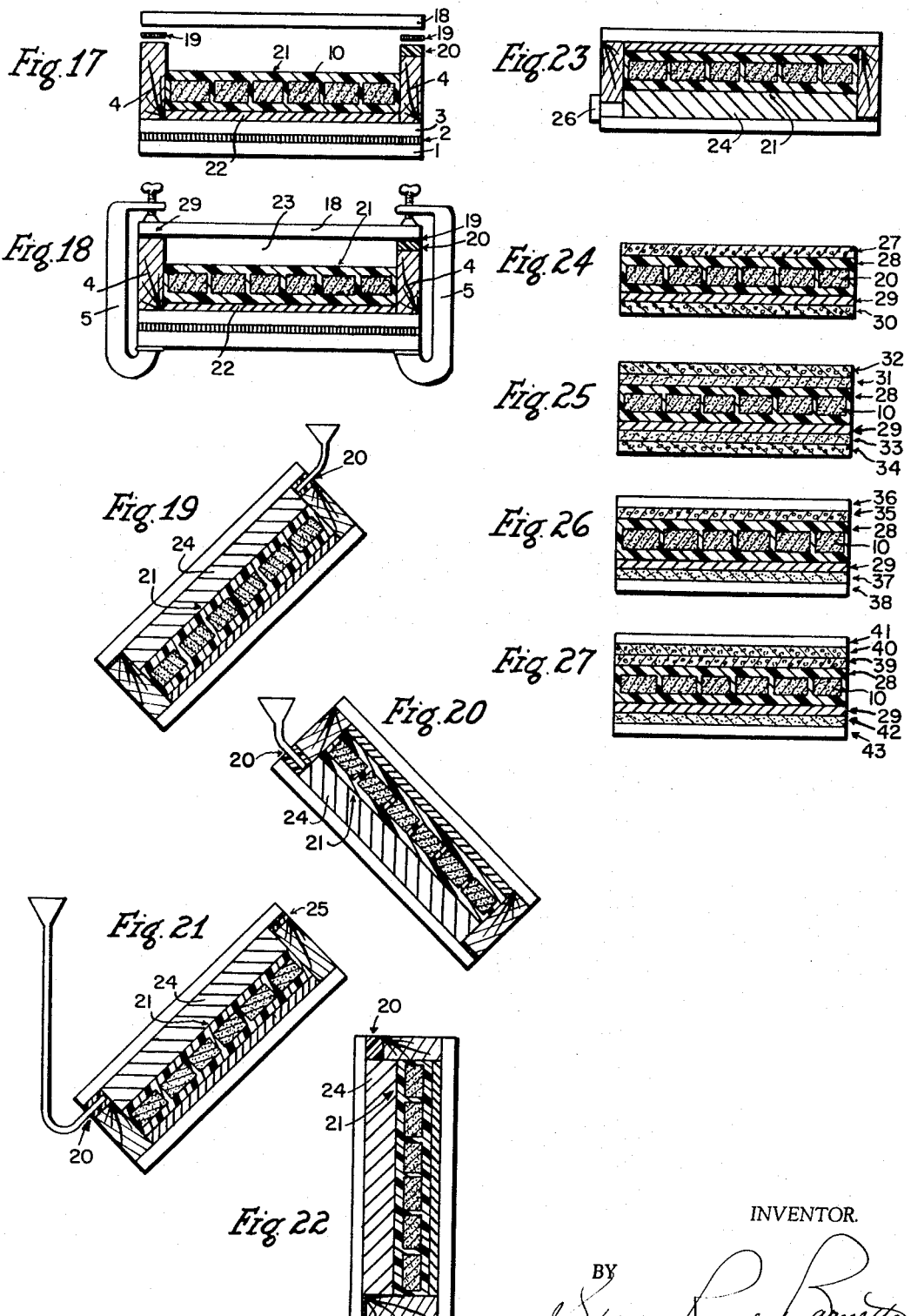

United States Patent Office 3,328,500
Patented June 27, 1967

3,328,500
METHOD OF MAKING SELF-REINFORCED
PLASTIC ARTICLES
Stanley Ronald Barnette, 90 Cherokee St.,
Miami Springs, Fla. 33166
Filed Jan. 14, 1963, Ser. No. 254,851
The portion of the term of the patent subsequent to
Jan. 15, 1980, has been disclaimed
3 Claims. (Cl. 264—108)

This application is a continuation-in-part of my co-pending application, Ser. No. 808,599, filed Apr. 24, 1959.

This invention relates to a process for producing plastic articles namely, structural panels, table tops, flooring, skylights, roofing, furniture, sandwich walls, window sills, etc., comprising a slab core stock means positioned between two plastic bodies, whereby said plastic bodies and core are mutually self-reinforced and self-bonded.

Another object of this invention is to provide slab cores readily machined so as to be surrounded and interlocked into the plastic bodies of the article that covers said core.

It is another object of this invention to produce articles having plastic bodies self-formed, self-bonded and interlocked to the core, with any desired exterior surface finish and having a decorative effect visible through the plastic, said core providing rigidity, lightweightedness, acoustical properties, shock-proof properties, insulation properties, etc.

In accordance with these and other objects which will become apparent hereinafter, the instant invention will now be described with reference to the accompanying drawings illustrating a preferred embodiment thereof.

In the drawings:

FIGURE 1 is a portion of a sheet of slab core stock to be used in connection with this invention and FIGURE 2 depicts a cross-sectional view of said core in perspective.

FIGURES 3 and 4 are cross-sectional views of molds that may be employed in the practice of this invention.

FIGURES 5 through 7 are cross-sectional views of the basic steps to envelope a core.

FIGURE 8 is a portion of a plastic article produced in accordance with this invention and FIGURE 9 illustrates the same article in a cross-sectional view.

FIGURES 10 through 16 are cross-sectional views illustrating the steps of decorating the liquid resin and enveloping the core to form an article with one finished surface.

FIGURES 17 through 23 are cross-sectional views of the steps involved in order to produce an article with two finished surfaces.

FIGURES 24 through 27 are cross-sectional views of some examples of articles produced using the processes described in this invention.

With reference to the drawings, the instant invention will now be described with reference to an example.

FIGURE 1 depicts a portion of a slab core stock means 10 having holes 44 drilled from one surface side of said core through and out the other surface. The diameter, position and number of holes depend on the amount of reinforcement desired. In FIGURE 2 a cross-sectional view of said core 10 illustrates the holes 44 arranged in a given order. As may be seen, the illustrated core is a planar sheet of uniform thickness.

FIGURE 3 depicts a mold assembly comprising a leveled platform 1, a metal foil blanket 2, a mold base 3 and mold walls 4. The mold walls and the mold base are tightly secured by means of clamps 5 to form the open mold 6. The open mold 6 in some instances may be replaced by a one section cavity mold illustrated in FIGURE 4, whenever standard sizes are manufactured.

The simple mold forms illustrated in 4 of FIGURE 3 are of the melamine ("Formica" covered plywood) type as they can be very readily shaped to provide the desired side wall contours of the mold.

The mold base 3 as indicated in FIGURE 3 is a glass or melamine type having a surface conforming to the desired surface finish of the article, and a releasing compound for the mold base and the mold walls must be used. In the event that a polyester film is used to form the mold base and or the mold walls, no coating is necessary as this material in itself acts as a ready release.

The one section cavity mold illustrated in FIGURE 4 includes rubber, metal, glass or plastic material and in the case of rigid materials, the mold walls will form with the mold base an angle over 90° to permit the removal of the article from the mold.

Referring to FIGURE 5 an example of an article produced by this method will be illustrated step by step through the succeeding illustration, consisting in a 48" diameter table top.

For the example of the 48" diameter table top a mixture is prepared consisting of 4 quarts of polyester resin, ⅓ quart of styrene, 1 dram of cobalt naphthenate (6% cobalt) and 3 ounces of black polyester paste.

One third of the mixture is placed in a separate container and mixed with 1% of methyl ethyl ketone peroxide (60%), stirred and poured into the open mold on top of the mold base which surface conforms to the desired exterior surface finish of the article, to a partial depth of the mold, leveled to the edges and permitted to harden to a certain degree, as indicated by 7 of FIGURE 5. The remaining two thirds of the mixture are mixed with 1% of methyl ethyl ketone peroxide (60%) stirred and poured on top of the first cured plastic 7 as illustrated in 8 of FIGURE 6. Then the core ¾" thick and slightly narrower than the mold rim is positioned on top of this liquid resin 8, by means of the removable device 9 so that the core 10 remains aligned in a parallel plane referred to the first plastic cured surface, permitting the resin to rise through and permeate the edges and holes and flow and cover the top surface of the core, permitting said resin to self-bond to the first plastic layer and to the core until set, as depicted in FIGURE 7.

The article when removed from the mold will have a plastic body interlocking a core by both sides and by plastic nerves through said core, said plastic body consisting of two self-bonded plastic layers. This method of interlocking the core provides a mutually self-reinforced plastic-body-to-core-article, because in some instances the core will add strength to the plastic and in other instances the plastic will provide the strength. This is particularly important when using foam cores because the plastic will act as a rigid member to maintain the stability of the article.

In the alternative the core can be positioned parallel to said horizontal support and thereafter a liquid catalyzed modified resin can be cast on the support in such a manner that it covers at least one face of said core. Thus for a 48 inch diameter tabletop a mixture is prepared consisting of 4 quarts of polyester resin, ⅓ quart of styrene, 1 dram of cobalt naphthenate (6% cobalt) and 3 ounces of black polyester paste.

One half of the mixture is placed in a separate container and mixed with 1% of methyl ethyl ketone peroxide (60%), stirred and poured on top of the core so that the catalyzed mixture rises to a partial depth of the mold and permeates a portion of the edges of the core. Again in the alternative after this first layer hardens to a certain degree the remaining half of the mixture is mixed with 1% of methyl ethyl ketone peroxide (60%), stirred and poured on top of the first layer to completely cover the top surface of the core.

FIGURE 8 is a side view of a portion of said self-reinforced article illustrating the plastic nerves through the core 10 and FIGURE 9 is a cross-sectional view of said article illustrating the plastic nerves extending from both sides of the plastic 8 that covers the core 10 and the first plastic layer 7 self-bonded to the layer 8.

This article has a finished surface that corresponds to the mold plate and a secondary even plastic surface that corresponds to the last cured plastic, both black.

Whenever a deep three-dimensional decorative effect is desired to be visible through the plastic surface, this may be accomplished by means of the following variations:

(a) Decorative effect formed in the the first liquid resin quantity poured into the mold.

(b) Decorative effect formed in the second liquid resin quantity poured on top of the first cured layer which also covers the top surface of the core.

The decorative effect can be formed in the first liquid resin poured in the mold by means of any of the following techniques:

The first example illustrated in FIGURE 10 consists in adding to a predetermined amount of liquid catalyzed resin one amount of pearlescence pigment, stirring, and pouring into the mold to form a liquid layer 11, by hand means agitating this liquid mixture in a combing motion to disperse and orient the pearlescence pigment forming a pattern of choice, suspending this combing operation as soon as the increase in the resin viscosity indicates that the gel stage is reached, thus permitting the pattern to remain fixed into the resin.

The second example illustrated in FIGURE 11 consists in pouring a predetermined quantity of liquid catalyzed resin 11 into the mold and by hand means introducing discrete lamellar particles such as mother of pearl flakes in a desired pattern of choice before the increase in the resin viscosity indicates that the gel stage is reached. Proper timing can be controlled by means of accelerator- and-catalyst-to-resin ratios and operating temperature.

The third example is illustrated in FIGURE 12 wherein by means of a fine pointed instrument that has previously been slightly impregnated or tipped with black polyester paste, black veins are formed in the liquid catalyzed resin mixed with a pearlescence pigment to simulate a marble surface.

Also, referring to FIGURE 7, the second liquid mixture pour that remains or two thirds of the total to envelope the core can be mixed with bronzing powder and combed or mottled after the liquid resin covers the top surface of the core. To produce a black marble effect, the fine pointed instrument is tipped with white polyester paste or any other light color of choice.

Using the described methods the article may have one or two decorative sides, but whenever a deeper three-dimensional decorative effect is desired additional steps may be followed:

(a) Forming the decorative effect by means of decorative layers in combination with one opaque layer that forms the background for the decorative effect and the masking medium for the core.

(b) Forming a transparent plastic layer to provide the finished surface of the article and additional decorative layers in combination with the opaque layer that forms the background for the decorative effect and the masking medium for the core.

The general method of forming a first decorative layer 11, by any of the techniques described in FIGURES 10, 11 and 12, pouring an opaque plastic layer 12 and covering the core 10 with the last pigmented pour 13, is indicated in FIGURES 13 through 15.

The second general method of forming a first transparent plastic layer 14 poured into the mold, adding one layer with decorative effect 15, another opaque layer 16 and the last pigmented layer 17 enveloping the core 10 is illustrated in a cross-sectional view in FIGURE 16, indicating the arrangement of said layers.

Following the described procedures the finished article when removed from the mold will have one finished surface and a secondary even and flat surface, its flatness depending on the viscosity of the resin or the amount of monomer or thinner used.

Sometimes in order to obtain a secondary smooth surface this may be achieved simply by adding a small amount of melted paraffin in styrene. This secondary surface may also be sanded, polished or buffed.

In order to produce an article with two perfect and desired finished surfaces, the additional steps to be followed are illustrated in FIGURES 17 through 23.

This is accomplished by means of fitting on top of the existing mold assembly after the clamps are removed, a top cover plate the underside of which conforms to the desired exterior surface finish of the article and a gasket to form a closed mold. This is depicted in FIGURE 17 wherein the top cover plate 18 and the gaskets 19 are in position to be fitted on top of the existing mold assembly described in FIGURE 3. In FIGURE 18 the closed mold is already formed with the clamps 5 tightly securing the top cover plate 18 and the gaskets 19 against the mold walls 4 forming a cavity 23 limited by the top surface of the last cured plastic 21, the mold walls of the existing mold 4, the gaskets 19 and the underside of the top cover plate 18. The slot 20 has previously been machined in the mold walls 4 to provide means to introduce the liquid resin into said cavity and to permit the air to escape through said opening.

Then the entire mold assembly is tilted to an appropriate position so as to permit to introduce the liquid catalyzed resin 24 into the cavity 23 either from the top or from the bottom, as illustrated in FIGURES 19 through 22. In order to facilitate the entrapped air to escape from the cavity, the slot 20 must be properly shaped and located and also the mold assembly can be rotated.

After the cavity is filled and no air bubbles are present the mold may be stored for cure in any desired position, one example illustrated in FIGURE 22, but preferably in a horizontal position depicted in FIGURE 23 so as to guarantee that the liquid resin remains on the face of the top cover plate, plugging the slot by means of plug 26. This position permits better results, because the last plastic formed in opposite direction to the preceding layers when cured will provide isotropic properties, equal opposite stresses and an extremely hard plastic surface.

The article when removed from the mold will show two perfect finished surfaces, polished, satin, embossed, raised, sculptured, etched, irregular, etc.

In order to form decorative effects having three-dimensional characteristics visible through this secondary finished surface formed by means of the top cover plate, it is possible to pour additional layers on top of the last cured plastic that covers the core and form the decorative effect as indicated in FIGURES 10, 11 and 12, before fitting the top cover plate, illustrated in FIGURES 26 and 27.

FIGURE 24 illustrates a cross-sectional view of an article with one finished surface and a secondary even surface comprising one decorative layer 30 that corresponds to the finished surface of the article, one opaque layer 29 forming the background for the decorative layer 30 and the masking medium for the core, the pigmented layer 28 that envelopes the core 10, and a decorative layer 27 that corresponds to the secondary even surface of the article, the background for this secondary decorative effect provided by the plastic 28 that envelopes the core.

FIGURE 25 illustrates a cross-sectional view of an article with one finished surface and a secondary even surface comprising one decorative layer 34 that corresponds to the finished surface of the article, another decorative layer 33 to form with the preceding layer a deeper three-dimensional effect, one opaque layer 29 forming the background for the decorative layers 33 and 34 and the masking medium for the core, the pigmented layer 28 that envelopes the core 10, one decorative layer 31 formed on top of the layer 28 that covers the core and another decorative layer 32 that corresponds to the secondary even surface of the article formed on top of the preceding decorative layer 31, the background for the secondary decorative effect in layers 31 and 32 provided by the pigmented layer 28 that envelopes the core.

FIGURE 26 illustrates a cross-sectional view of an article with two finished surfaces comprising a transparent layer 38 that corresponds to one of the finished surfaces of the article, one decorative layer 37 formed on top of this transparent layer, one opaque layer 29 forming the background for the decorative layer 37 and the masking medium for the core, the pigmented layer 28 that envelopes the core 10, one decorative layer 35 formed on top of the layer 28 that envelopes the core and a transparent layer 36 that corresponds to the second finished surface of the article one decorative layer 37 formed on top of decorative layer 35.

FIGURE 27 illustrates a cross-sectional view of an article with two finished surfaces comprising a transparent layer 43 that corresponds to one of the finished surfaces of the article, one decorative layer 42 formed on top of the transparent layer 43, one opaque layer 29 formed on top of the decorative layer 42 forming the background for the decorative effect and the masking medium for the core, the pigmented layer 28 that envelopes the core 10, one decorative layer 39 formed on top of the pigmented layer 28 that envelopes the core, another decorative layer 40 formed on top of the preceding decorative layer 39 and a transparent layer 41 that corresponds to the second finished surface of the article formed in the closed mold on top of the decorative layer 40.

What is claimed is:

1. The method of producing rigid structural enveloped core articles which comprises: (A) introducing a predetermined quantity of a mixture of pigmented liquid catalyzed modified resin into a leveled shallow open mold, having a bottom conforming to the desired exterior surface finish of the article, to a partial depth of the mold and permitting the liquid resin to cure, (B) pouring a predetermined amount of liquid pigmented catalyzed modified resin having at least one amount of at least one kind of orientable medium mixed with the liquid mixture on top of the last cured plastic, (C) positioning a slab core stock means, having a plurality of holes previously machined through its entire thickness and disposed in a predetermined arrangement at the surfaces of said core and being slightly narrower than the mold rim, into the said liquid resin, said core displacing said resin so as to permit the resin to rise around the edges and through the holes of the core and flow and cover the top surface of the core, utilizing removable means to secure and align said core in a parallel plane referred to the first cured plastic surface, (D) at a point subsequent to step (B) dispersing the orientable media in a combing motion within the liquid resin in order to achieve a deep three-dimensional decorative effect and pattern choice, suspending said combing operation as soon as the increase in the resin viscosity indicates that the gel stage is reached thus permitting the effect and pattern to be permanently fixed in the resin, (E) permitting said resin to self-bond to the first plastic and to the core and to cure, (F) fitting a top mold cover to the existing mold form the underside of which cover conforms to the desired exterior surface finish of the article, to provide a predetermined space cavity, (G) tilting the mold and introducing into said cavity sufficient liquid catalyzed modified resin to fill the cavity, permitting the air to escape through an uppermost slot, (H) plugging the slot, (I) storing the mold in a horizontal position so that the last introduced resin remains on the inner surface of the top mold cover, permitting said resin to cure and set, forming a structural integrally interlocked and core-to-plastic body self-reinforced and self-bonded surfacing material with two opposite formed plastic bodies providing equal stress and isotropic properties, having two finished plastic surfaces, with a decorative effect visible through the plastic.

2. The method of producing rigid structural enveloped core articles which comprises: (A) introducing a predetermined quantity of liquid transparent catalyzed modified resin into a leveled shallow open mold, having a bottom conforming to the desired exterior surface finish of the article, to a partial depth of the mold and permitting the liquid resin to cure, (B) pouring at least one predetermined quantity of a mixture of liquid pigmented catalyzed modified resin having at least one amount of at least one kind of orientable medium mixed with said liquid mixture on top of the last cured plastic, (C) dispersing the orientable media in a combing motion within the liquid resin in order to achieve a deep three-dimensional decorative effect and pattern of choice suspending said combing operation as soon as the increase in the resin viscosity indicates that the gel stage is reached and permitting the effect and pattern be permanently fixed into the resin, (D) permitting said last resin poured to cure, (E) applying a predetermined amount of a mixture of pigmented liquid catalyzed modified resin on top of the last cured plastic and permitting the same to cure, (F) pouring an additional quantity of a mixture of pigmented liquid catalyzed modified resin on top of the last cured plastic, (G) positioning a slab core stock means, having a plurality of holes previously machined through its entire thickness and disposed in a predetermined arrangement at the surface of said core and being slightly narrower than the mold rim, into the said liquid resin, said core displacing said resin so as to permit the resin to rise around the edges and through the holes of the core and flow and cover the top surface of the core, utilizing removable means to secure and align said core in a parallel plane referred to the first cured plastic surface, permitting said resin to self-bond to the last cured plastic and to the core and to cure, (H) pouring at least one predetermined amount of a mixture of liquid pigmented catalyzed modified resin, having at least one amount of at least one kind of orientable medium mixed with the liquid mixture on top of the last cured plastic, (I) dispersing the orientable media in a combing motion wherein the liquid resin order to achieve a deep three-dimensional decorative effect and pattern of choice, suspending said combing operation as soon as the increase in the resin viscosity indicates that the gel stage is reached and permitting the effect and pattern to be permanently fixed into the resin, (J) permitting said resin to cure, (K) fitting a top mold cover to the existing mold form the underside of which cover conforms to the desired exterior surface finish of the article, to provide a predetermined space cavity, (L) tilting the mold and introducing into said cavity sufficient liquid catalyzed modified resin to fill the cavity, permitting the air to escape through an uppermost slot, (M) plugging the slot and storing the mold in a horizontal position so that the last introduced resin remains on the inner surface of the top mold cover, permitting said resin to cure and set, forming a structural integrally interlocked and core-to-plastic body self-reinforced and self-bonded surfacing material with two opposite formed plastic bodies providing equal stress and isotropic properties, having two finished plastic surfaces, with a decorative effect visible through the plastic.

3. The method of producing rigid structural enveloped core articles which comprises: (A) introducing a predetermined quantity of a mixture of pigmented liquid catalyzed modified resin into a leveled shallow open mold having a bottom conforming to the desired exterior surface finish of the article, to a partial depth of the mold and permitting the liquid resin to cure, (B) pouring a predetermined amount of liquid catalyzed modified resin on top of the last cured plastic, (C) positioning a slab core stock means, having a plurality of holes previously formed through its entire thickness and disposed in a predetermined arrangement at the surfaces of said core and slightly narrower than the mold rim into the said liquid resin, said core displacing said resin so as to permit the resin to rise around the edges and through the holes of the core and flow and cover the top surface of the core, utilizing means to secure and align said core in a parallel plane referred to the first cured plastic surface, (D) introducing decorative media into said liquid resin and forming a pattern of choice before the increase in the resin viscosity indicates that the gel stage is reached, proper timing being controlled by means of accelerator and catalyst to resin ratios and operating temperature, permitting said resin to self-bond to the first plastic and to the core and to cure, (E) fitting a top mold cover to the existing mold form the underside of which cover conforms to the desired exterior surface finish of the article, to provide a predetermined space cavity, (F) tilting the mold and introducing into said cavity sufficient liquid catalyzed modified resin to fill the cavity, permitting the air to escape through an uppermost slot, (G) plugging the slot and (H) storing the mold in a horizontal position so that the last introduced resin remains on the inner surface of the top mold cover, permitting said resin to cure and set, forming a structural integrally interlocked and core-to-plastic body self-reinforced and self-bonded surfacing material with two opposite formed plastic bodies providing equal stress and isotropic properties, having two finished plastic surfaces, with a decorative effect visible through the plastic.

References Cited

UNITED STATES PATENTS

| | | | |
|---|---|---|---|
| 1,396,934 | 11/1921 | Judd | 264—273 X |
| 1,703,476 | 2/1929 | Conant | 264—273 |
| 1,766,471 | 6/1930 | Van Dusen | 264—273 X |
| 1,806,863 | 5/1931 | Paisseau. | |
| 1,827,549 | 10/1931 | Villain | 264—255 |
| 1,886,972 | 11/1932 | Payne. | |
| 2,054,454 | 9/1936 | Thies et al. | |
| 2,165,393 | 7/1939 | Lilienfeld. | |
| 2,265,226 | 12/1941 | Clewell et al. | |
| 2,285,122 | 6/1942 | McIntosh | 161—112 |
| 2,480,749 | 8/1949 | Marks. | |
| 2,480,750 | 8/1949 | Leary | 264—24 |
| 2,480,751 | 8/1949 | Marks. | |
| 2,480,752 | 8/1949 | Rogers. | |
| 2,668,328 | 2/1954 | Porter. | |
| 2,712,190 | 7/1955 | Sobel. | |
| 2,969,106 | 1/1961 | Ribel et al. | 161—112 |
| 2,976,093 | 3/1961 | Reiling | 264—273 |
| 3,055,148 | 9/1962 | Christy | 264—255 |
| 3,072,973 | 1/1963 | Barnette | 264—247 |
| 3,075,249 | 1/1963 | Sucher | 264—255 |
| 3,085,295 | 4/1963 | Pizzino et al. | 264—255 |

OTHER REFERENCES

Halenz et al.: "Methyl Methacrylate as Imbedding Agent," Journal of Chemical Education, vol. 19, July 1942, pp. 313 and 314, copy in Scientific Library and in 264–271.

Rohm and Haas Company: "Embedding Biological Specimens in Acrylic Plastics," August 1947, pp. 1–5.

"Irridescent Built Into Plastics," Modern Plastics, January 1951, pp. 71–73.

ROBERT F. WHITE, *Primary Examiner.*

A. H. BRODMERKEL, F. MARLOWE, L. S. SQUIRES, J. A. FINLAYSON, *Assistant Examiners.*